Patented May 16, 1933

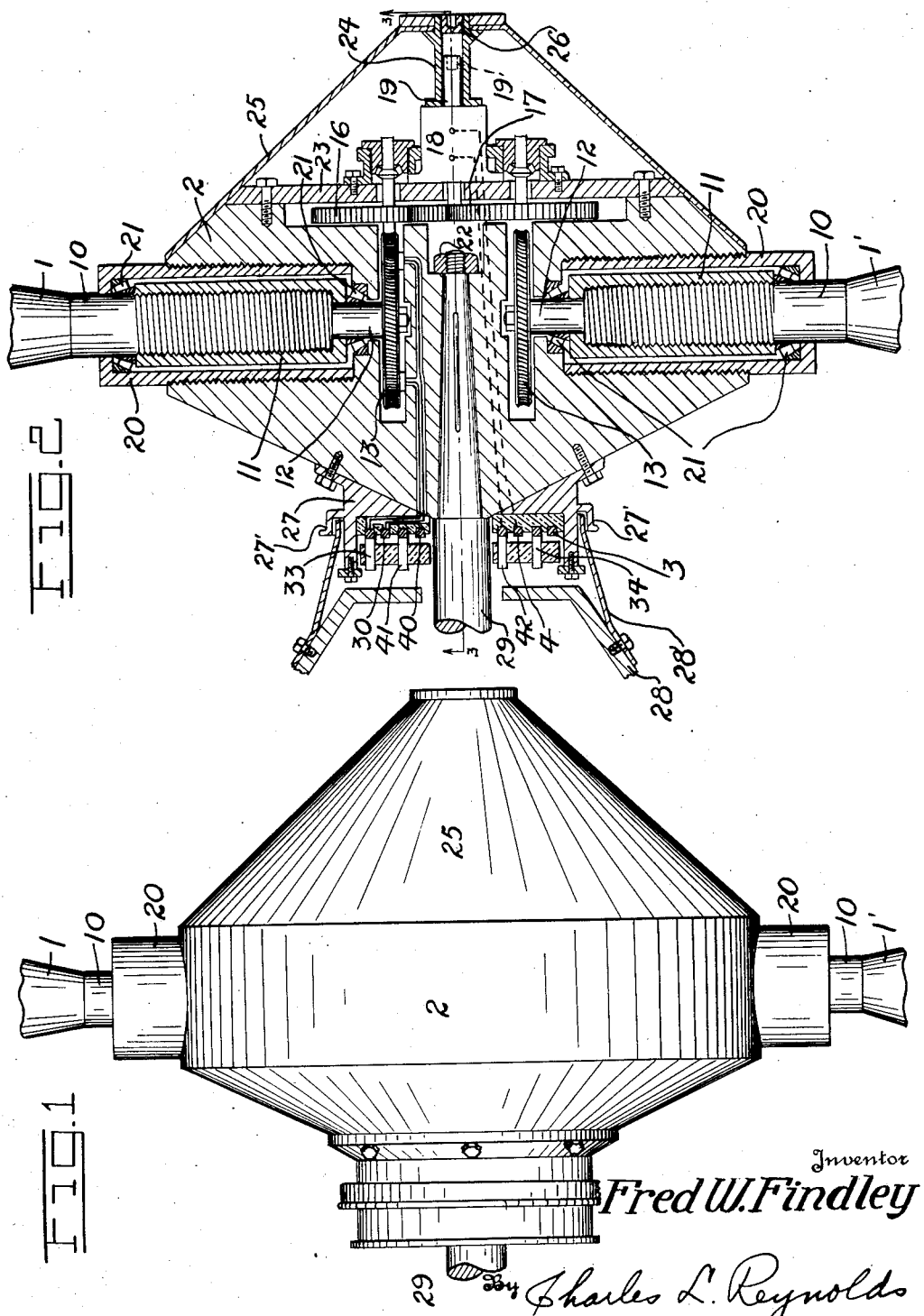

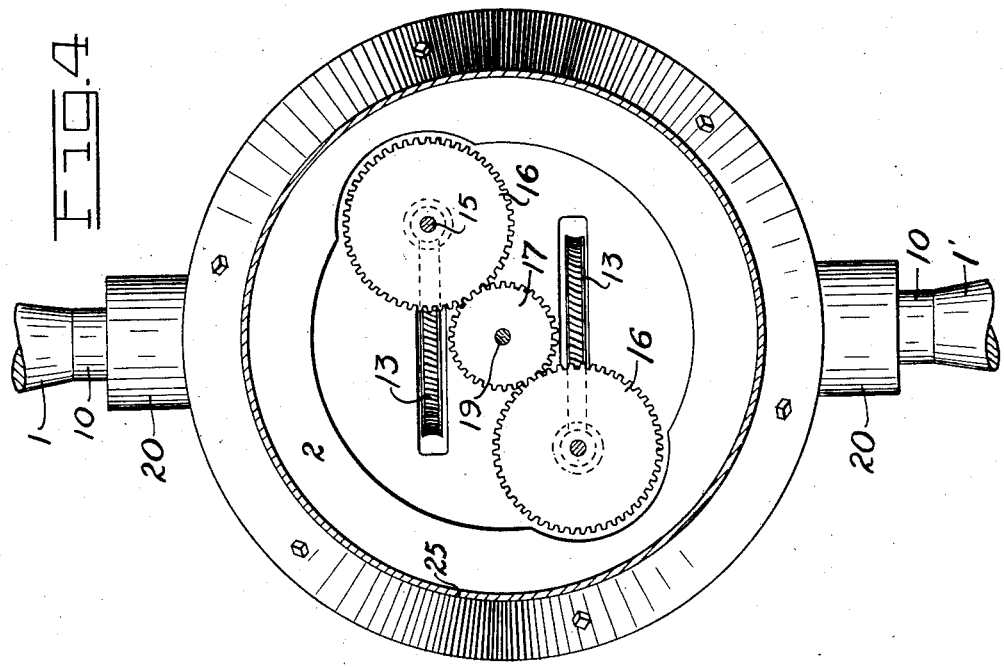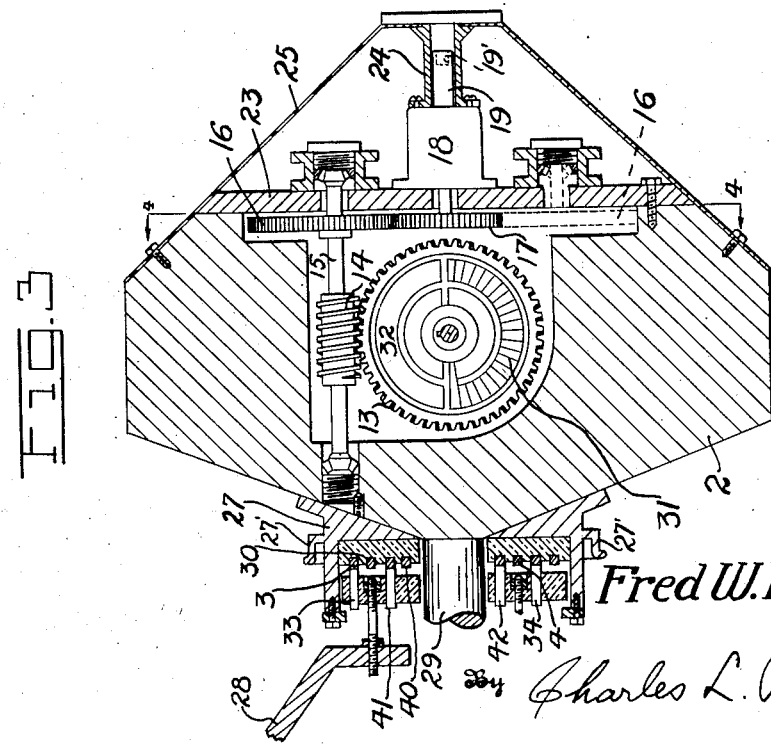

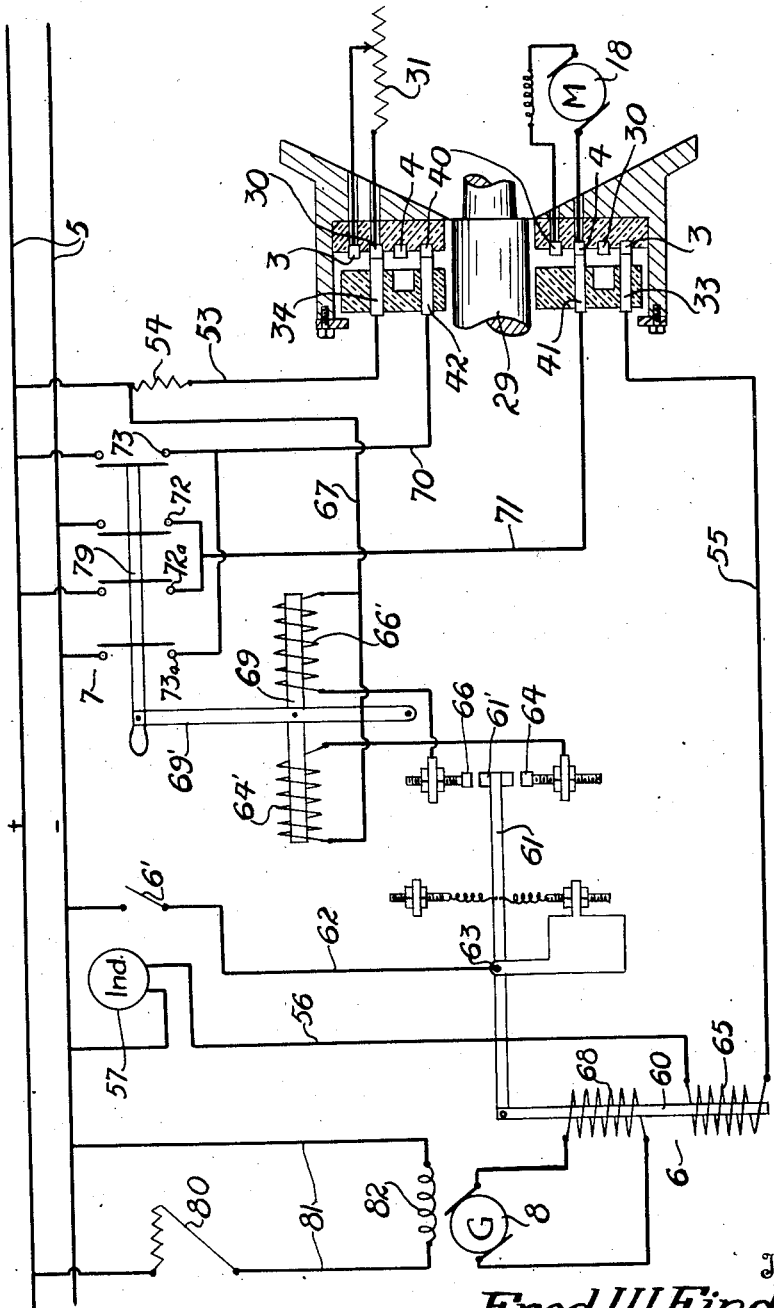

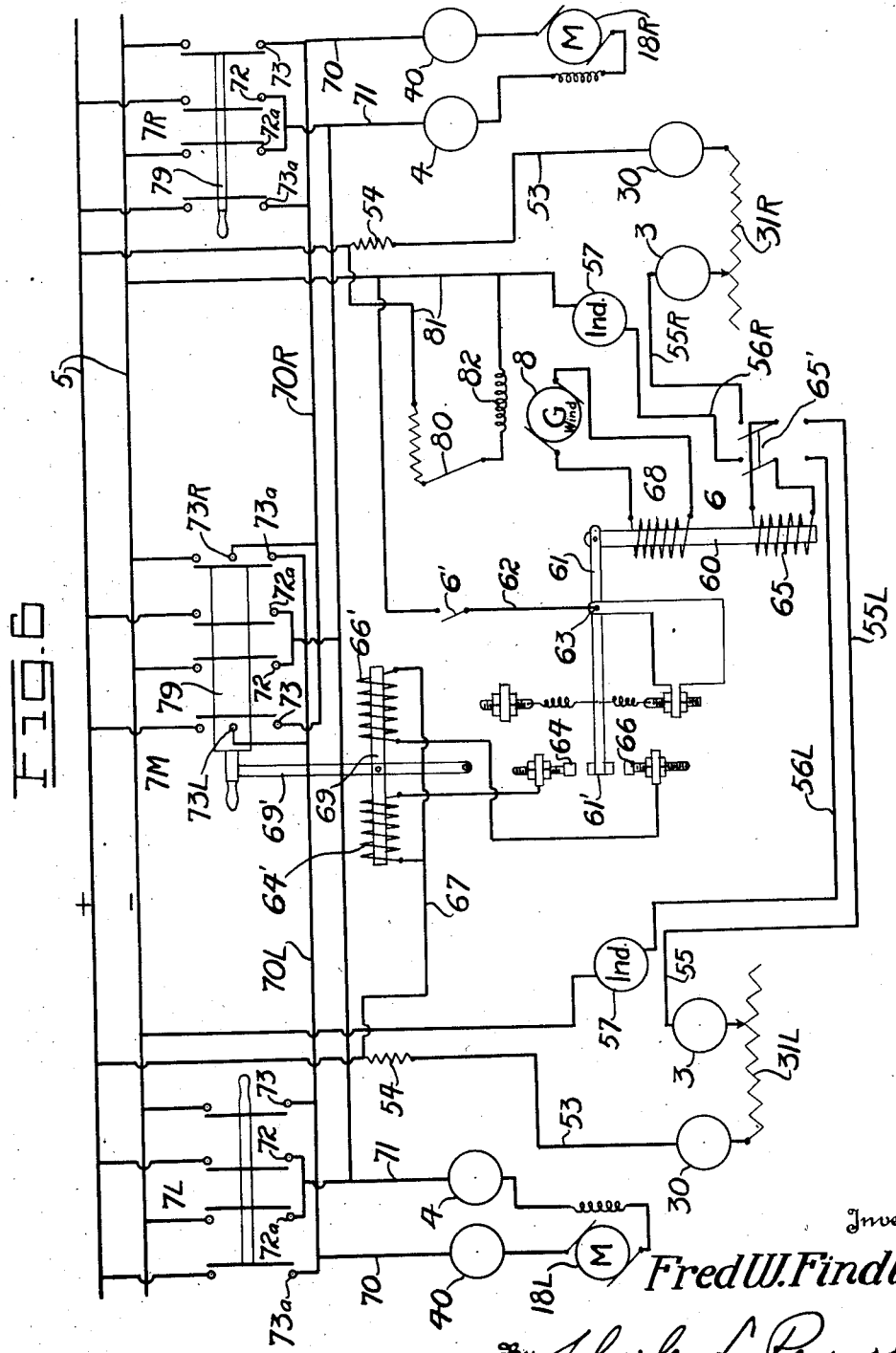

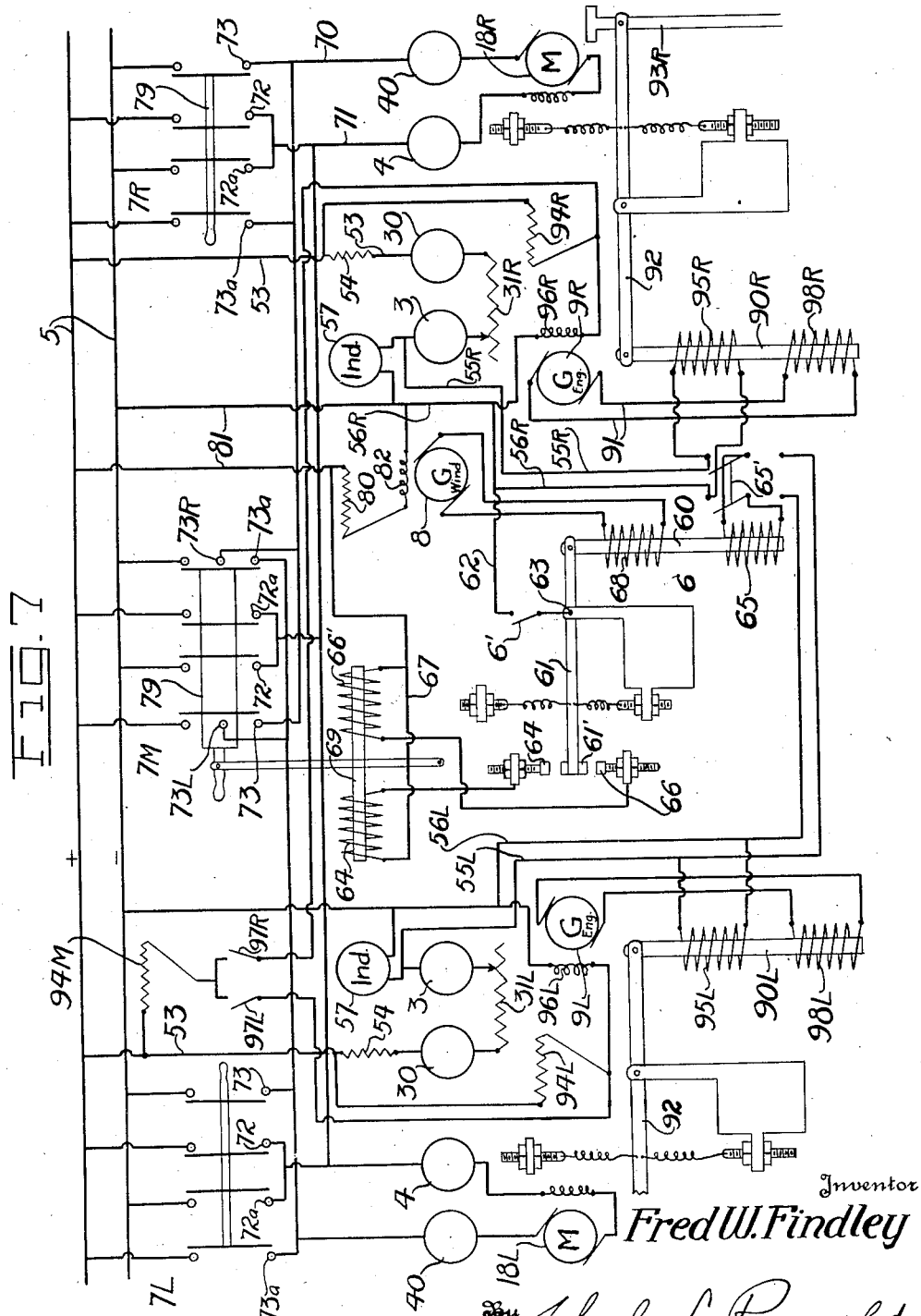

1,908,894

UNITED STATES PATENT OFFICE

FRED W. FINDLEY, OF LONGVIEW, WASHINGTON

SPEED CONTROLS FOR AIRCRAFT

Application filed May 20, 1930. Serial No. 454,162.

My invention relates to a control system for automotive vehicles, whereby the force of the driving engine or engines is so applied as to produce the most efficient utilization of the power, substantially without change of speed of the driving engine, and to adjust such application of the driving forces in accordance with the load or resistance met with under varying conditions.

More specifically, my invention relates to a control system intended for aircraft generally, both airplanes and airships, whereby the adjustable-pitch blades of a propeller or propellers are automatically adjusted in accordance with a speed-responsive element, such as an element responsive to air speed, and whereby the supply of fuel to the engine is variable in response to engine speed changes, or either may be employed alone, whereby the engine may operate, with substantially no change in speed, at the most efficient engine speed, notwithstanding changes in air speed or increased loads, and the blades of the propeller or propellers will be automatically or manually adjusted, as desired, to apply the force of the propelling engines in accordance with change of conditions; and the fuel supply to the engine will be increased to compensate for a tendency to slow down and stall, whereby, also, the air speed of the aircraft may be varied by varying the pitch of the propeller, the engine operating at its most economical speed.

The three primary ends attained by my invention, applied to aircraft, are,—1st, economy, in maintaining the most economical pitch of the propeller blades for the engine speed and air speed selected by the pilot, without vibration; 2nd, safety, in developing full automatic control in accordance with changes of conditions, and regardless of pilot's attention or inattention (and also while landing), yet reserving full manual control in an emergency and resumption of automatic control when the emergency has passed; 3rd, convenience, in permitting the pilot to attend to other matters while in flight, as navigation, stability, elevation, etc.; in permitting rapid warming up, without the annoying wind stream; in taking off, permitting application of power most effectively to attain flying speed quickly, etc.

Thus, for instance, in the special application of my invention to airplanes or airships, among my objects are:

First, to allow the pilot of an airplane or the chief engineer in the control cabin of a dirigible full manual control of the pitch of the propeller blades, so that the pitch can be increased to the maximum to attain maximum speed when necessary, or may be adjusted to a neutral or reversed position to act as a brake, or may be adjusted manually to any intermediate position;

Second, to allow the airplane pilot, or the chief engineer of a dirigible, without the interposition of individual engineers in the several engine gondolas, to have full manual control of the speed of the several engines, or all simultaneously, yet to allow automatic control of each engine within itself, so that any tendency of a particular engine, or of all of them, to deviate from any set speed will be self-corrected;

Third, to automatically control the pitch of the propeller blades in accordance with the air speed of the aircraft, so that, for instance, should an airplane thus equipped be climbing at such an angle that it loses speed to an extent that the propeller pitch does not correspond to the air speed, and the propeller loses its efficiency (such a condition being preliminary to a spin), the pitch of the propeller blade will be decreased to apply the force available more strongly and efficiently to the air, thus tending to attain a pitch corresponding to the rate of advance. On the contrary, if the air speed increases, the pitch of the propeller blades is correspondingly increased;

Fourth, to provide a control for the fuel feed to the engines which does not interfere with manual control thereof, but which may be made automatically responsive to changes in engine speed, so that, for instance, should a climb be so steep that the engine tends to stall, the decrease in engine speed (or the tendency to decrease) will cause additional fuel to be supplied to the engine or engines, to compensate for the decrease of speed and to develop a higher speed or greater power. On the contrary, a tendency in an engine to speed up will be counteracted by lessening the fuel supply. As a result, the engines will operate at the desired economical speed for which they are set, at highest efficiency. The result is particularly desirable for Diesel-powered airplanes;

Fifth, to provide a combination of air speed and engine speed controls, whereby each may operate to control the appropriate part of the propulsion mechanism, as the occasion requires, cooperating and maintaining a relative balance, all automatically, yet all subject to the manual control of the pilot at any time;

Sixth, to provide such a control system, which is applicable to single-engine planes or aircraft generally, or to multiple-engined aircraft, and specifically to avoid the necessity of an engineer and relief for each individual engine in lighter-than-air craft;

Seventh, to provide such control means of small size and weight, such that the operating parts associated with the propeller can be incorporated in the propeller hub, without the necessity of adding considerably to the weight of the propeller as a whole, or to the centrifugal effect thereof.

Other objects, and more particularly such as refer to the mechanical details of my invention, and the adjustment thereof, will be readily ascertained from a study of the attached drawings, wherein my invention is shown in a number of illustrative forms, and as now preferred by me, and of this specification and the claims which terminate the same.

My invention comprises the novel parts and the novel combination and arrangement thereof, as shown in the accompanying drawings, described in this specification, and as will be more particularly pointed out in the claims at the end of this specification.

Figure 1 is a side elevation of my propeller hub, mounted upon the end of the engine shaft, the blades themselves being broken off.

Figure 2 is an axial section through my device, taken from substantially the same view point as Figure 1.

Figure 3 is a section through my device, taken substantially on the line 3—3 of Figure 2.

Figure 4 is a transverse section through my device on the line 4—4 of Figure 3.

Figure 5 is a diagram of my device, with a single speed control only, and intended for application to a single propeller, that is to say, the simplest form illustrating that phase of the principles of my invention.

Figure 6 illustrates my invention diagrammatically in a form applicable to multiple-engined planes, but with a single speed-control only.

Figure 7 illustrates my invention diagrammatically in a form which is suitable for multiple-engined planes and with two speed control devices, for instance, an air speed control and an engine speed control.

Heretofore control of the air speed of aircraft while in flight has been directly and solely by means of variation of the engine speed. The pitch angle of the propeller blades was a constant. An engine operates best at a given speed, and if the pitch angles of the propeller blades are not set so as to correspond to the speed of the engine, the utilization of power is not as efficient as it should be. The air speed of the craft (within the capability of the engine) is dependent upon the pitch angle setting of the propeller blades. It follows, then, with the automatic adjustment of the propeller blades, that the engine speed may be kept constant (within limits defined by its capabilities) and the power developed at such engine speed be most efficiently applied in accordance with air speed by changing the pitch in accordance with changes of air speed. The former variable factor, engine speed, is thus made the constant, and control of air speed is achieved not by variation of engine speed, but by variation of the pitch angles.

This control will be sufficient so long as the load placed upon the engine is within its capabilities, but if the load increases, as by a steep climb, to the point where the engine, at the given speed, would stall, it is essential that it develop more power to prevent stalling. On the other hand, if the load decreases, as by diving, the engine would tend to race. Under such conditions the engine speed must be varied; in the first instance, it must be increased, by supplying more fuel; in the second instance, it must be decreased, by supplying less fuel. For such uses I provide automatic controls linking the engine fuel feed control (throttle valve) with an engine speed device, whereby changes in engine speed are compensated by changes in the amount of fuel supplied.

There is thus a combination of controls. Assuming a given engine speed and air speed, there will be a given fuel feed, dependent on the engine speed, and there will be a given pitch setting, dependent on the air speed. Should the aircraft start to climb, it will tend to lose air speed, and the pitch will decrease. If the climb is sharp enough, but not otherwise, the added load will make itself felt in a tendency for the engine to slow down, which will increase the fuel feed to maintain controlled engine speed. Should the ship dive, instead of climbing, the increase in air speed would increase the pitch, but when the load on the engine lessened to a point where it tended to speed up, the fuel supply is automatically cut down, and the engine tends to slow down again.

None of this prevents the pilot from changing his propeller pitch at will, or from supplying more or less fuel to change his engine speed. I have provided a manual control for each individual engine, or for all engines, whereby the engine speed can be varied from idling to maximum speed, and other manual controls whereby the pitch of the blades of any given propeller, or all propellers, can be varied at will, from neutral or reverse to the maximum. By the automatic controls the pilot is assured that the air speed and engine speed, once established, and after the manual controls have been released, the automatic controls will take care of themselves, and he can address himself to other matters, such as navigation.

Heretofore, the term "engine" has been employed to designate the prime source of propulsion of the aircraft, and that term will be so used hereafter, to distinguish from an electric motor forming part of the control mechanism.

In effect, insofar as control of the pitch of the propeller blades is concerned, my invention comprises an electric motor, preferably mounted in the rotatable hub of a propeller, which is connected to the oscillatable blades, likewise mounted in this hub, to turn them in one direction or the other when the motor is energized. The electric motor is reversible, and motor-reversing means are provided, whereby the same may be reversed at will, these usually taking the form of a reversing switch. Motor control means are provided, these being of two parts balanced one against the other. One of these parts is controlled by a speed-responsive device, such as a wind-driven generator, the output of which is governed by the air speed of the aircraft, and the other part of the electrical control may be controlled by a rheostat or like means, which is responsive to variations in the position of the blades corresponding to differences of pitch. For normal operation, these two parts of the electrical control are balanced one against the other, but when one becomes the stronger, for instance, if the air speed increases, the part corresponding thereto becomes the stronger and overcomes the other part, controlled by the pitch of the blades, and the reversing means is moved from its normally inoperative position into position to operate the motor one way or the other to compensate for the change in the electrical control means. As soon as proper compensation is made the reversing means reverts to its normal inoperative position.

Insofar as the engine control is concerned, my invention comprises a device operative to increase or diminish the fuel supply to the engine, the same being governed by a like balanced two-part electrical control, one part controlled by a speed-responsive device such as a generator driven from the engine itself, the output of which is governed by the speed of the engine, and the other part of this latter electrical control may be controlled by the same rheostat, responsive to variations in the pitch of the propeller blades.

So long as the aircraft is operating at an air speed which is in consonance with the pitch of the propeller blades, and presumably that pitch which most economically develops that air speed, no change will result. Should the air speed of the craft fall off, immediately and without attention from the pilot the air speed control member will come into operation to lessen the pitch compensably to the new air speed. The engine speed control is not affected thereby, and the engine's speed is unchanged. Similarly, when the air speed of the craft increases, the propeller pitch increases, without affecting the engine speed. In each case the reaction through the rheostat brings the two parts of the air speed control into equilibrium to stop the pitch adjustment until some further change occurs.

So long as the engine speed is adequate to the load it will run at selected speed which is presumably the most economical one. Should the engine speed tend to decrease, immediately and without attention from the pilot the engine speed control will come into operation to increase the fuel supply compensably to the added load. In effect the engine speed is thereby maintained at the speed which is most economical for the load placed upon it. Similarly, when the engine speed increases, the fuel supply is lessened. In each such case the change in engine speed occasions a change in air speed, as is now always the case, but the reaction through the same rheostat brings the engine speed control into equilibrium again, to stop further change in the fuel supply until some further change occurs.

While my invention may take various mechanical forms, it will be best understood if one of those forms, as illustrated in Figures 1 to 4 inclusive, is understood, and I will therefore describe this form, not in any sense as limiting myself to this precise form, but as illustrative of a form which may be variously changed and adapted to the necessities of a given situation.

The propeller blades 1 and 1' are indicated only by their inner ends, and terminate in shanks 10, which are received in suitable bearings 21 in a rotatable propeller hub body 2, which is suitably keyed and secured upon the projecting end of an engine shaft 29. The mounting of the propeller blade for oscillations may be any that is desired, and I have shown the shank 10 as threaded in a sleeve-like shaft 11, which terminates at its inner end in a reduced extension 12, on which is secured a gear 13, by means of which the propeller blade may be oscillated on its own axis. A retainer cap 20 engages the outside of the sleeve 11 to retain the blade in place and to counteract the centrifugal force, tending to throw the blade outwardly. This cap 20 is threaded in the hub 2. In this form the bearings 21 are interposed between the sleeve 11 and the cap 20 and the hub 2.

In order to oscillate the blades 1 and 1' simultaneously and equally, their respective gears 13 are in mesh with worm pinions 14 on shaft 15 (see Figure 3), and on the outer end of these shafts 15 are gears 16, which in turn are both in mesh with a driving gear 17, which is driven from a motor 18, secured upon a plate 23, which is secured upon the face of the hub 2. For purposes of adjustment in the shop, the shaft 19 of the electric motor 18 may project into a sleeve 24, likewise secured upon the propeller hub 2, or within an extension 25 thereof, and be provided with a socket 19', wherein may be inserted the squared end of a crank to permit turning of this shaft 19. The end of the sleeve 24 is closed by a suitable plug 26. The arrangement just described produces a balanced hub, with the weight concentrated at the axis, so far as possible, reducing the centrifugal effect to the minimum.

Associated with one or with both of the propeller blades, but preferably with one only for each propeller, is a rheostat. This is conveniently associated with one of the worm gears 13, as may be seen in Figure 3. This rheostat may consist of a plurality of segments 31 corresponding to varying resistances, and a return terminal complemental to all of the segments 31, designated by the numeral 32. Suitable brushes are provided in position to contact with the segments 31 and the return terminal 32 respectively, and these leads extend through the body of the hub 2 to rings 3 and 30 respectively (see Figures 2 and 3) which are mounted upon the outside of the hub in position to be contacted by the respective brushes 33 and 34. Similarly, the leads to the motor 18 may extend through the body of the hub 2, to the respective rings 4 and 40, which in turn are contacted by the fixed brushes 41 and 42 respectively. By these or like means, a current is conducted to and from the rheostat and the motor, mounted within the rapidly rotating hub 2.

The rings and brushes referred to above should be suitably protected from the weather, and as an instance of such protection, I have illustrated the apron 28' secured to the nose of the fuselage 28, and received beneath a circular flange 27' on the hub 2 or the extension 27 secured thereto and supporting the several rings 3, 30, 4 and 40. The apron, coupled with the centrifugal effect of the flange 27', will keep water out of the electrical connections just described.

It may be noted here that the parts are all so arranged that it is only necessary to remove the plate 23, whereupon the retaining nut 22 can be removed and the entire hub may be slipped off of the engine shaft 29; the rings 3, 30, 4 and 40 all come off with the hub, and the brushes and brush-holders may be left attached to the nose of the fuselage. No part is in contact with the engine shaft 29. This makes it a comparatively simple job to remove and replace a propeller.

Having in mind the mechanical structure described, we may now refer to Figure 5, which shows the connection of the mechanism and the electrical devices heretofore referred to, in the control system. The main source of current is illustrated in the mains 5, which is illustrated as a source of direct current, although alternating current might be employed. A lead 53 through a resistance 54, which may be adjustable for each installation, but which would be fixed when once adjusted, connects the rheostat 31 with one side of the main 5 through the brush 34 and the ring 30. The rheostat is connected to the other side of the main through the ring 3, the brush 33 and the leads 55 and 56. Between these leads 55 and 56 is included one part of a two-part balanced electrical control device, generally indicated by the numeral 6, and the part which is included between the leads 55 and 56 is designated as the solenoid 65. An indicator or galvanometer is also indicated in the lead 56 at 57.

Connection between the motor 18 and the mains 5 is accomplished through leads 70 and 71, which connect with the respective brushes 42 and 41; these leads 70 and 71 connect with terminals 72 and 72a on the one hand, and 73 and 73a on the other hand, of a motor reversing mechanism, which conveniently takes the form of a reversing switch 7. Normally, the movable contacts of this switch 7 are held in a neutral position, but when moved to the right, as seen in Figure 5, connection is established between the terminals 72 and 73, and the two sides of the main 5, and current is delivered to the motor 18, tending to turn it in a given direction. If the movable contacts of the switch 7 are moved to the left, as seen in Figure 5, contact is established between the terminals 72a and 73a, and the two sides of the main 5, in such a way as to deliver current to the reversible motor 18 in the opposite direction, causing it to reverse, and according to the direction of rotation of this motor, the blades 1 and 1' of the propeller are oscillated in one direction or the other.

This motor-reversing means, or reversing switch 7, is under the control of the two-part balanced electrical control heretofore referred to, and shown at 6. One part of this, as has been pointed out, consists of the solenoid 65, the strength of the current through the same being a function of the position of the blades 1 and 1' communicated through the rheostat 31. The other part, 68, is connected in a circuit including the generator 8, which would be wind-driven, or which would in some other manner be driven at a speed which is a function of the air speed of the craft. Its current output is therefore variable. For a given speed of the generator 8, and a given setting of the blades 1 and 1', the force of the solenoid 65 will balance the force of the opposed solenoid 68, and the common core 60 will remain in equilibrium. Any increase in one force over the other will cause a movement of the core 60 towards the stronger, and will result in movement of the switch arm 61, pivoted at 63, to which the solenoid core 60 is connected.

This switch arm 61 is connected by a lead 62 to one side of the main 5, and its swinging end 61' is adapted to contact with one of two terminals 64 or 66. These in turn are connected by leads to one side of the respective solenoid coils 64' and 66', the opposite side of which is connected through a common lead 67 to the main 5 so as to be opposite in sign to the lead 62.

Any increase in the strength of the solenoid 68, for instance, due to increased air speed of the aircraft, will result in upward movement of the solenoid core 60 and contact between the terminal 61' and the terminal 64, which will energize the solenoid 64' and cause movement of the core 69, which is connected through the arm 69' to move the connected series of movable contacts 79 of the reversing switch 7, in such a direction as to cause current to flow through the terminals 72a and 73a, which energizes the motor 18, causing it to increase the pitch of the propeller blade, so that it bears the most efficient relation to the speed of the aircraft.

It will be noted that a switch 6' is included in the lead 62. This is intended to be manually opened or closed. With the switch 6' open no automatic operation is possible, since the selective contact 61' is dead. However, the reversing switch 7 may in all instances, whether the switch 6' is opened or closed be moved manually by the pilot to effect adjustment of the pitch of his propeller blades. Thus, when the engine is being warmed up, the propeller blades may be kept in neutral, and the engine will be warmed up without any load being placed upon the propeller blades. In consequence, it will not be necessary to employ chocks under the wheels, and there will be no slip-stream of air past the fuselage. When the pilot is ready to take off, the pitch of the blades is increased gradually until he attains sufficient speed for taking off, and when once in the air, having attained flying speed, the pilot may close the switch 6' and release the control-rod 79 of the switch 7, whereupon the automatic controls will govern.

It will be noted at 80 that there is a rheostat control for the circuit 81, which includes the field coil 82 of the generator 8. Variation of the strength of current in the field coil 82 varies the output voltage of the generator 8, and consequently, varies the range of strength of the solenoid coil 68. By these means, or equivalent means, the point at which equilibrium between the coils 68 and 65 of the air speed electrical control can be varied at will, and thus is provided a means for obtaining adjustment between the propeller pitch and the air speed of the craft.

It is quite evident that this device may be employed alone and without any automatic control for the engine speed, leaving the control of the engine speed, as heretofore, under the manual control of the pilot through a throttle lever, but since variations in the pitch of the propeller merely compensate for changes in air speed of the craft, and since there are speeds both low and high which may become dangerous, and it is necessary to maintain the air speed of the craft, particularly airplanes, between certain limits, it is desirable to provide an automatic control for the engine fuel supply. However, before taking up the engine speed control, it is desired to point out how the air speed control can be applied to several motors.

Refer now to Figure 6, wherein the parts are arranged to control the propellers of two engines. The two electric motors 18 are shown, one for each propeller, and to distinguish them, they have been given the suffixed letter R or L for right and left, as the case may be. Similarly, the rheostats 31 have been distinguished by the same suffixes. As to these devices, and as to the motor reversing means or switch 7, the devices are like that already described, and it does not seem necessary to go through the description again, since the parts are similarly numbered, but distinguished where necessary by the suffixed letter R or L.

It will be noted, however, that there is but one balanced two-part control, and but one generator 8. The generator 8, as before, is connected to one-half of the two-part control electrical control, including in its circuit the solenoid coil 68. The opposing coil 65 is not directly connected to either one of the rheostats 31R or 31L, but is connected rather by means of a double-throw switch 65', which, when thrown in one direction, connects the coil 65 with the leads 55R and 56R respectively, or when thrown in the opposite direction, connect with the leads 55L and 56L. The purpose of the switch at 65' is to make it possible to control the current passing through the coil 65 by one or the other of the rheostats 31, but not by both at any one time. If one motor, or any of the connections thereto, should fail to function properly, it is possible to switch the controls over to the other propeller and its motor, and to make the rheostat in the other propeller control the two-part balanced control at 6. Assuming the switch at 65' to be thrown so as to control the device through the righthand propeller, the operation will be just as described before with an exception to be noted, and while current will be passing through the rheostat 31L, it will not affect any of the controls.

The exception noted is that the electrical control at 6 is not connected to the switch 7R, which directly controls the direction of the motor 18R. The motor 18R may at all times be manually controlled through the switch 7R, but these individual switches, such as 7R, are not automatically controlled. Instead there is provided a master reversing switch designated 7M. Such a switch is substantially identical with the individual switches, and has like terminals connected in the same circuit, but it is also provided with additional contacts corresponding in number to the number of propellers the pitch of which is to be controlled. These contacts are indicated at 73L and 73R. 73R is connected in the lead 70R, while the contact 73L is connected in the lead 70L.

It will be evident that, without the contact 73R for instance, if the master switch 7M were to be moved to the right, the contacts 72a and 73a would be energized, all other contacts being left dead, and this would energize the left motor, but in order to energize the right motor also, so that the pitch of the blades of both propellers will be adjusted simultaneously and equally, the additional contact 73R is provided which is connected into the controls for the right motor 18R.

The master switch 7M is controlled as before by the opposed solenoids 64' and 66', energized as before by the movable switch arm 61.

So far as the operation is concerned, then, the doublethrow switch 65' merely determines whether the right propeller or the left propeller and its rheostat is to control. The master switch 7M is provided for reversing the motors, and reverses both of them simultaneously by means of an additional pair of leads which are included, so that three contacts are made, one a common contact and one for each of the electric motors in the individual propeller hubs. The entire automatic control, as before, may be cut out by leaving open the switch 6'. Adjustment of the strength of the air speed solenoid 68 is obtained by adjustment of the rheostat at 80, and the device is just like that previously described, except that it takes care of two propellers.

In Figure 7 is shown an arrangement for employment with an aircraft having two engines and having both the air speed control and the engine speed control. The air speed control for dual engines has already been explained, and the addition of the engine-speed control does not affect the operation of the air speed control.

Associated with each of the propelling engines is an engine-driven generator 9, the two being distinguished from each other by the suffixes L and R respectively. Each of these is connected in a circuit 91, which includes a coil 98, which is part of a two-part electrical control. Movement of the core 90 moves a tilting lever 92, to move a member such as 93R (the lefthand member corresponding thereto not being shown) which member is connected to the gas throttle for that particular propelling engine.

The other part, or coil 95, is connected up to the corresponding rheostat 31 at all times. Any increase in the strength of the current passing through the rheostats 31 increases the strength in the respective rheostat coils 95, moving their cores 90 inward, and depressing the corresponding throttle members 93, which would be so connected to the fuel supply for their respective propelling engines that such movement would increase the amount of fuel supplied, assuming an increase in current through the rheostats to be associated with an increase of pitch in the respective propellers.

Adjustment of the current strength through the fields 96L and 96R respectively of the generator 9 may be accomplished for the individual generators by means of a rheostat 94L and R, and this adjustment can be put into effect while the two engines are in operation. In this connection, it will be borne in mind that the automatic engine speed control is accomplished for both of the engines, and each in turn is controlled by the pitch of the propeller which it drives, whereas, the control of the pitch of both propellers was from a single, wind-driven, generator only. However, when it is desired to increase or decrease the engine speed of both engines simultaneously, this may be accomplished by means of the master rheostat 94M. When the maximum resistance is cut into the line by the individual rheostats 94L or 94R, the control may be through the master rheostat 94M, arranged in parallel to the individual rheostats, or the individual rheostats may be set for a selected resistance, and the control mainly effected through the master rheostat 94M. Switches 97L and 97R are connected in the individual lines branching from the master rheostat 94M; with these open the master control is ineffective, but control may be had of the individual engines through the individual rheostats 94L or 94R. It is my intention that the condition arising when the switches 97L and 97R are open, and all resistance of the individual rheostats 94L and 94R is cut out, shall result in idling the engines, leaving their individual control to the pilot through the rheostats 94L and 94R, until such time as the switches 97L and 97R are closed, and the rheostat 94M takes up the control.

When the air craft is in flight, with both automatic controls operating (air speed and engine speed), the pilot need only control the rheostat at 80 to adjust the propeller pitch with relation to the air speed of his craft, and need only regulate the rheostat at 94M to obtain control of the engine speed of his craft manually. Should he desire to change the propeller pitch momentarily, this may be done by means of the master reversing switch 7M, and as stated before, control of the engine speed is effected through the rheostat 94M, though it will be evident that control may be had manually of the members 93, controlling the supply of fuel to the individual engines without disturbing the setting of the automatic control means, or setting the same into operation.

It will be evident that various parts, such as the levers 61 and 92, will be properly balanced, and guarded against failure in any position of the plane. Similarly, motor brushes will be guarded against failure by reason of any centrifugal effect, and the device will generally be put into such mechanical form and so mounted as will best suit the purpose.

My invention, or the pertinent portions thereof, will find many uses. One of the problems in gyroscopic control of airplanes is to develop a source of constant potential current. A control such as this will regulate the pitch of the blades of the propeller which drives the wind-driven generator itself, as well as the blades of a propelling engine, and consequently, if the pitch of the blades of the wind-driven generator are regulated in accordance with the air speed of the craft, it is possible to produce constant potential energy. The principles of the device may be adapted also to marine craft, controlling the pitch of propeller blades in accordance with the speed of a vessel through the water, and controlling the fuel supply to the engine to accord with the pitch of the propeller blade.

What I claim as my invention is:

1. In an aircraft in combination with a rotatable mount and propeller blades oscillatably mounted therein, means automatically operating in accordance with variations in the air speed of the aircraft to compensably oscillate said blades.

2. In an aircraft, in combination with a rotatable propeller mount and propeller blades oscillatably mounted therein, means operable in accordance with variations in the air speed of the aircraft and controlled thereby to compensably oscillate said blades.

3. In combination with the driving engine of an aircraft, a rotatable mount and propeller blades oscillatably mounted therein, means operable in accordance with variations in the air speed of the aircraft to compensably oscillate said blades, and other means operable in accordance with the positions assumed by said blades to vary the engine's fuel supply to maintain controlled engine speed.

4. In an aircraft, in combination with a plurality of rotatable mounts and propeller blades oscillatably mounted in each, means operable in accordance with variations in the air speed of the aircraft to compensably oscillate all blades simultaneously and correspondingly in amount.

5. A control system comprising a source of current supply, a rotatable propeller hub, oscillatable blades mounted therein, a motor operable to oscillate said blades, a motor reversing means, a two-part normally balanced electrical control for said motor reversing means, means responsive to variations in the position of the blades to control one part of said control, and means responsive to variations in the vehicle's speed to control the other part thereof.

6. A motor control system as in claim 5, including electric operating means for moving said motor reversing means into positions corresponding to operation in each direction, and a normally open selective switch for energizing said operating means, when the switch is closed, said switch being operable by the electrical control means.

7. A motor control system as in claim 5, including electric operating means for moving said motor reversing means into positions corresponding to operation in each direction, and a normally open selective switch for energizing said operating means, when the switch is closed, said switch being operable by the electrical control means, and a manual switch in the circuit of said selective switch.

8. A control system comprising a source of current supply, a rotatable propeller hub, oscillatable blades mounted therein, a motor operable to oscillate said blades, a motor reversing means, a two-part normally balanced electrical control for said motor reversing means, means responsive to variations in the position of the blades to control one part of said control, and means responsive to variations in the vehicle's speed to control the other part thereof, and means for manually varying the balance between said latter two means.

9. A control system as in claim 5, the means responsive to speed variations comprising a wind-driven generator, and means for varying the field strength in said generator, to vary thereby the balance between the blade-controlled control means and the air speed control means.

10. A control system comprising a source of current supply, a rotatable propeller hub, oscillatable blades mounted therein, a motor operable to oscillate said blades, a motor reversing means, a two-part normally balanced electrical control for said motor reversing means, means responsive to variations in the position of the blades to control one part of said control, and means responsive to variations in the vehicle's speed to control the other part thereof, said motor reversing means being manually operable, and means manually operable at will to eliminate the said electric control means.

11. A control system as in claim 5, the motor being located in the rotatable hub, and the blade-controlled control means including a rheostat located in the hub and operable by oscillations of a blade therein.

12. A control system as in claim 5, the electrical control for the reversing means comprising a pair of opposed solenoids connected to the motor reversing means, each of said solenoids being connected to one side of the electric source, a selective switch connected to the other side of the electric source, a pair of terminals each corresponding to and connected to its respective solenoid, and adapted to be contacted by said selective switch to complete the circuit through its respective solenoid, and means connecting said switch to the balanced electrical control for operation thereby.

13. A control system as in claim 5, the electrical control for the reversing means comprising a pair of opposed solenoids connected to the motor reversing means, each of said solenoids being connected to one side of the electric source, a selective switch connected to the other side of the electric source, a pair of terminals each corresponding to and connected to its respective solenoid, and adapted to be contacted by said selective switch to complete the circuit through its respective solenoid, and means connecting said switch to the balanced electrical control for operation thereby, and a cut-out switch in said selective switch-solenoid circuit.

14. An aircraft control system comprising a source of electric current supply, a plurality of rotatable propeller hubs, oscillatable blades mounted in each thereof, a motor operable to oscillate the blades of each hub, a motor reversing means corresponding to each motor, a master motor reversing means connected in the circuit of each motor, a two-part normally balanced electrical control operatively connected for actuation of said master reversing means responsive to variations in the speed of the air craft to control one part of said control, and means responsive to variations in the position of a propeller blade to control the other part thereof.

15. A control system as in claim 14, including means to adjust the balance of the two parts of the electrical control, one part relative to the other.

16. A control system as in claim 14, each propeller having the last-mentioned means, and a switch to connect any one of said means to operate the two-part electrical control, and to disconnect all others.

17. In aircraft, a control system comprising a fuel supply means, a rotative air propeller, blades mounted therein and adjustable in pitch, means for automatically adjusting the pitch of said blades in accordance with variations in the air speed of the aircraft to compensably oscillate the blades, and means automatically responsive to changes in pitch of the blades to compensably adjust the fuel supply means to maintain a controlled speed to the engine supplied thereby.

18. A control system as in claim 17, including a generator the output of which is a function of the rate of engine speed, a two part electrical control means comprising the means connected to adjust the fuel supply, one part thereof being controlled by the output of said generator, and the other part being controlled by the change of pitch of the propeller.

19. A control system as in claim 17, and in combination therewith, means responsive to change in the relative speed of the vehicle to compensably adjust the propeller pitch.

20. A control system as in claim 17, for controlling the fuel supply to a plurality of engines, and in combination therewith, means in addition to such automatic fuel supply adjusting means for manually changing the controlled speed of each individual engine, and master means for manually changing the controlled speed of all said engines.

21. A control system for aircraft comprising, in combination, a rotative propeller hub, blades oscillatably mounted therein, an engine for rotating the propeller, fuel supply means therefor, and means the operation of which is initiated by change of air speed to vary complementally the propeller pitch and the fuel supply, to maintain constant engine speed and propeller pitch corresponding to the load at such engine speed.

22. In an aircraft, in combination with a driving engine, a rotatable mount driven therefrom, propeller blades oscillatably mounted therein, means automatically operating in accordance with variations in the pitch of the propeller blades to compensably vary the engine's fuel supply, and means driven by said engine cooperating with said first means to compensably vary the fuel supply in accordance with the engine speed, to maintain constant engine speed.

Signed at Longview, Cowlitz County, Washington, this 14th day of May, 1930.

FRED W. FINDLEY.